US007880748B1

(12) United States Patent
Sevigny (10) Patent No.: US 7,880,748 B1
(45) Date of Patent: Feb. 1, 2011

(54) AUDIO VIEW USING 3-DIMENSIONAL PLOT (75) Inventor: Benoit Sevigny, Montreal (CA)

(73) Assignee: Apple Inc., Cupertino, CA (US)

(*) Notice: Subject to any disclaimer, the term of this patent is extended or adjusted under 35 U.S.C. 154(b) by 1568 days.

(21) Appl. No.: 11/206,536

(22) Filed: Aug. 17, 2005

(51) Int. Cl.
G09G 5/00 (2006.01)
G06T 11/20 (2006.01)

(52) U.S. Cl. .................. 345/619; 345/440; 702/68; 381/56; 704/251

(58) Field of Classification Search .......... 345/440; 702/68
See application file for complete search history.

(56) References Cited

U.S. PATENT DOCUMENTS

| 3,634,759 | A | * | 1/1972 | Koshikawa et al. | 324/76.22 |
| 4,257,104 | A | * | 3/1981 | Martin et al. | 702/68 |
| 4,306,186 | A | * | 12/1981 | Nakazawa et al. | 324/76.23 |
| 4,682,248 | A | * | 7/1987 | Schwartz | 360/32 |
| 4,818,931 | A | * | 4/1989 | Naegeli et al. | 324/76.22 |
| 4,870,348 | A | * | 9/1989 | Smith et al. | 324/76.19 |
| 5,119,076 | A | * | 6/1992 | Wilson | 345/440.1 |
| 5,241,302 | A | * | 8/1993 | Thong | 345/589 |
| 5,576,978 | A | * | 11/1996 | Kitayoshi | 702/77 |
| 5,729,145 | A | * | 3/1998 | Blades | 324/536 |
| 5,845,241 | A | * | 12/1998 | Owechko | 704/203 |
| 6,115,684 | A | * | 9/2000 | Kawahara et al. | 704/203 |
| 6,377,260 | B1 | * | 4/2002 | Kuehnel | 345/440.1 |
| 6,681,191 | B1 | * | 1/2004 | Pickerd et al. | 702/76 |
| 6,760,676 | B2 | * | 7/2004 | Nygaard, Jr. | 702/79 |
| 6,999,899 | B2 | * | 2/2006 | Gross et al. | 702/183 |
| 7,006,085 | B1 | * | 2/2006 | Acosta et al. | 345/419 |
| 7,006,092 | B2 | * | 2/2006 | Guenther | 345/440.1 |
| 7,236,900 | B2 | * | 6/2007 | Hagen et al. | 702/67 |
| 7,340,397 | B2 | * | 3/2008 | Fado et al. | 704/251 |
| 2003/0058243 | A1 | * | 3/2003 | Faust et al. | 345/440 |
| 2004/0260544 | A1 | * | 12/2004 | Kikumoto | 704/221 |
| 2005/0114128 | A1 | * | 5/2005 | Hetherington et al. | 704/233 |
| 2005/0175193 | A1 | * | 8/2005 | Karjalainen et al. | 381/103 |
| 2006/0116873 | A1 | * | 6/2006 | Hetherington et al. | 704/226 |

OTHER PUBLICATIONS

Fitz, Kelly et al., "On the Use of Time-Frequency Reassignment in Additive Sound Modeling," located <http://www.eecs.wsu.edu/~kfitz/paper/aes2001.pre.pdf#search='On%20the%20Use%20of%20TimeFrequency%20Reassignment%20in%20Additive%20Sound%20Modeling%E2%80%9D'>, pp. 1-25.
Fitz, Kelly et al., "Transient Preservation Under Transformation in an Additive Sound Model," located at <http://www.cerlsoundgroup.org/Loris/papers/transients.pdf#search='%E2%80%9CTransient%20Preservation%20Under%20Transformation%20In%20An%20Additive%20Sound%20Model%E2%80%9D'>, 4 pages.

(Continued)

Primary Examiner—M Good Johnson
(74) Attorney, Agent, or Firm—Hickman Palermo Truong & Becker LLP (57) ABSTRACT Techniques for editing signal data using a three-dimensional visual representation of the signal data are provided. According to one embodiment of the invention, audio signal data is displayed as a surface occupying three dimensions. User input, which indicates a selected area of the surface, is received. The audio signal data is then modified by applying an effect to one or more parts of the audio signal data that correspond to the selected area.

28 Claims, 2 Drawing Sheets

OTHER PUBLICATIONS

Hainsworth, Stepen W. et al., "Analysis of Reassigned Spectrograms for Musical Transcription," IEEE Workshop on Applications of Signal Processing to Audio Acoustics 2001, located at <http://people.deas.harvard.edu/~patrick/publications/hainsworth_waspaa_01.pdf#search='%E2%80%9CAnalysis%20%of%20Reassigned%20Spectrograms%20for%20Musical%20Transcription%E2%80%9D'>, 4 pages.

Hainsworth, Stephen et al., "Time Frequency Reassignment: A Review and Analysis," Technical Report, Cambridge University Engineering Dept, located at <http://www-sigproc.eng.cam.ac.uk/~swh21/tfrrep.pdf#search='Time%20Frequency% 20Reassignment% 3A%20A%20Review%20and%20Analysis'>, pp. 1-27.

Hainsworth, Stephen et al., "Time-Frequency Reassignment: Measures and Uses," Cambridge University Engineering Dept., located at <http://www-sigproc.eng.cam.ac.uk/oldsite/music_proc/2003/papers/hainsworth_CMPC.pdf#search='%E2%80%9C%20TimeFrequency%20Reassignment%3A%20Measures%20and%20Uses%E2%80%9D'>, 4 pages.

Peeters, Geoffrey et al., "Signal Characterization in Terms of Sinusoidal and Non-Sinusoidal Components," Proceedings DAXF98, Barcelona, Spain, Nov. 19-21, 1998, located at <http://mediatheque.ircam.fr/articles/textes/Peeters98b/>, 4 pages.

Röbel, Axel, "Transient Detection and Preservation in the Phase Vocoder," located at <http://citeseer.ist.psu.edu/cache/papers/cs/30289/http:zSzzSzwww.ircam.frzSzequipeszSzanalyse-synthesezSzroebelzSzpaperzSzicmc2003.pdf/transient-detection-and-preservation.pdf>, 4 pages.

* cited by examiner

AUDIO VIEW USING 3-DIMENSIONAL PLOT

FIELD OF THE INVENTION

The present invention relates to a computer program for viewing a visual representation of audio signal data and, more specifically, to a computer program for viewing and editing audio signal data using a three-dimensional representation of that audio signal data.

BACKGROUND

There exist many computer programs today that assist a user in editing data on a computer. For example, a word processing program enables a user to enter and modify textual data. A computer-aided drafting program enables a user to enter and modify graphical data. A digital signal-editing program enables a user to load digital signal data, modify the digital signal data, and save the digital signal data. Such a digital signal may represent audio data, for example.

For example, some computer programs allow a user to edit audio signal data. The audio signal data represents sound, such as sound that was recorded using a microphone. In order to illustrate aspects of the audio signal data to a user, such computer programs typically display a visual representation of the audio signal data. For example, a computer program may display a two-dimensional waveform that depicts the variation of the amplitude of the audio signal data's represented sound over time.

A user might want to edit audio signal data for various reasons. For example, the user might want to apply effects such as echo to the audio signal data's represented sound, or the user might want to cut out a selected time portion of the audio signal data. Sometimes, a recorded sound may contain undesirable elements that the user would like to eliminate from the audio signal data. For example, a recording of music at a live concert might contain background sounds such as coughing and sneezing. When the user really just wants a clear recording of the music, the user would rather eliminate the coughing and sneezing that is heard in the background.

Eliminating such undesirable elements can be challenging. Merely cutting out the time portions of the audio signal data that contain the undesirable elements is over-inclusive because the cutting also eliminates sound that the user want to retain in the audio signal data. Using a two-dimensional amplitude-over-time display as discussed above, a user might try to adjust aspects of the audio signal data in order to remove only the undesirable elements. However, a two-dimensional amplitude-over-time display often does not provide a user with the ability to alter audio signal data in a precise manner. Too often, the only adjustments that the user can make using such a display are relatively coarse, inexact, and approximate. The two-dimensional amplitude-over-time display does not provide the user with the detailed information that he needs in order to perform "surgical" operations to excise undesirable sounds while leaving the remainder of the audio signal data intact and faithful to the source sound.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, a three-dimensional representation of audio signal data is displayed. For example, the audio signal data may be displayed as a "lumpy" surface occupying three dimensions, which may be representative of frequency (which regulates pitch), amplitude (which regulates volume), and time. More specifically, the vertically represented, or "Y" dimension, may correspond to amplitude. At each time interval within the audio signal data, the surface may indicate, for each frequency in a range of frequencies, the amplitude of that frequency at that time interval. If the amplitude of a particular frequency at a particular time is significant, then the heightened amplitude may show up as a "lump" or "spike" on the surface at the point on the surface that corresponds to the particular frequency and time. Displaying a visual representation of the audio signal data in this manner provides the user with more information about the audio signal data than two-dimensional visual representations can provide.

Furthermore, according to techniques described herein, a portion of the surface is visually distinguished from the remainder of the surface. This portion of the surface is the "selected area." For example, an approximately square region on the surface, bordered in a visually distinctive way, may indicate which portion of the surface is currently the selected area. In response to user input, such as the movement of a mouse, a "selection indicator" designating the selected area may be moved to different locations on the surface in a manner similar to the way that a cursor or pointer may be moved about a graphical user interface.

According to techniques described herein, as the selection indicator is moved to different locations on the surface, a user-selected effect may be applied to one or more portions of the audio signal data that correspond to the selected area, similar to the way that paint may be applied to a surface as a brush is moved over that surface. For example, the selected effect might be applied to the corresponding portions while a mouse button is being depressed. The result of applying the effect to the corresponding portions of the audio signal data may, in some cases, alter the amplitude of the frequencies that occur within the selected area. In such cases, the display of the surface may be modified, as the effect is applied, to represent the results of the application of the selected effect on the audio signal data. For example, portions of the surface that were formerly flat might be raised, and/or portions of the surface that were formerly raised might be flattened.

As the selection indicator is moved about the surface, the selected effect might affect some aspects of the audio signal data but not others. To make a explanatory comparison, in some graphical image editing programs, a user can select an tool that, when applied to a selected area of a graphical image, causes a first selected color, but not any other colors, to be replaced in that area with a second selected color. Such a tool beneficially allows the user to make precise changes using relatively imprecise user inputs. In a similar manner, according to techniques described herein, a selected effect may be applied to an exclusive subset of aspects of a selected portion of audio signal data without applying that effect to other aspects of the selected portion.

Example Three-Dimensional Display

Figure 1:
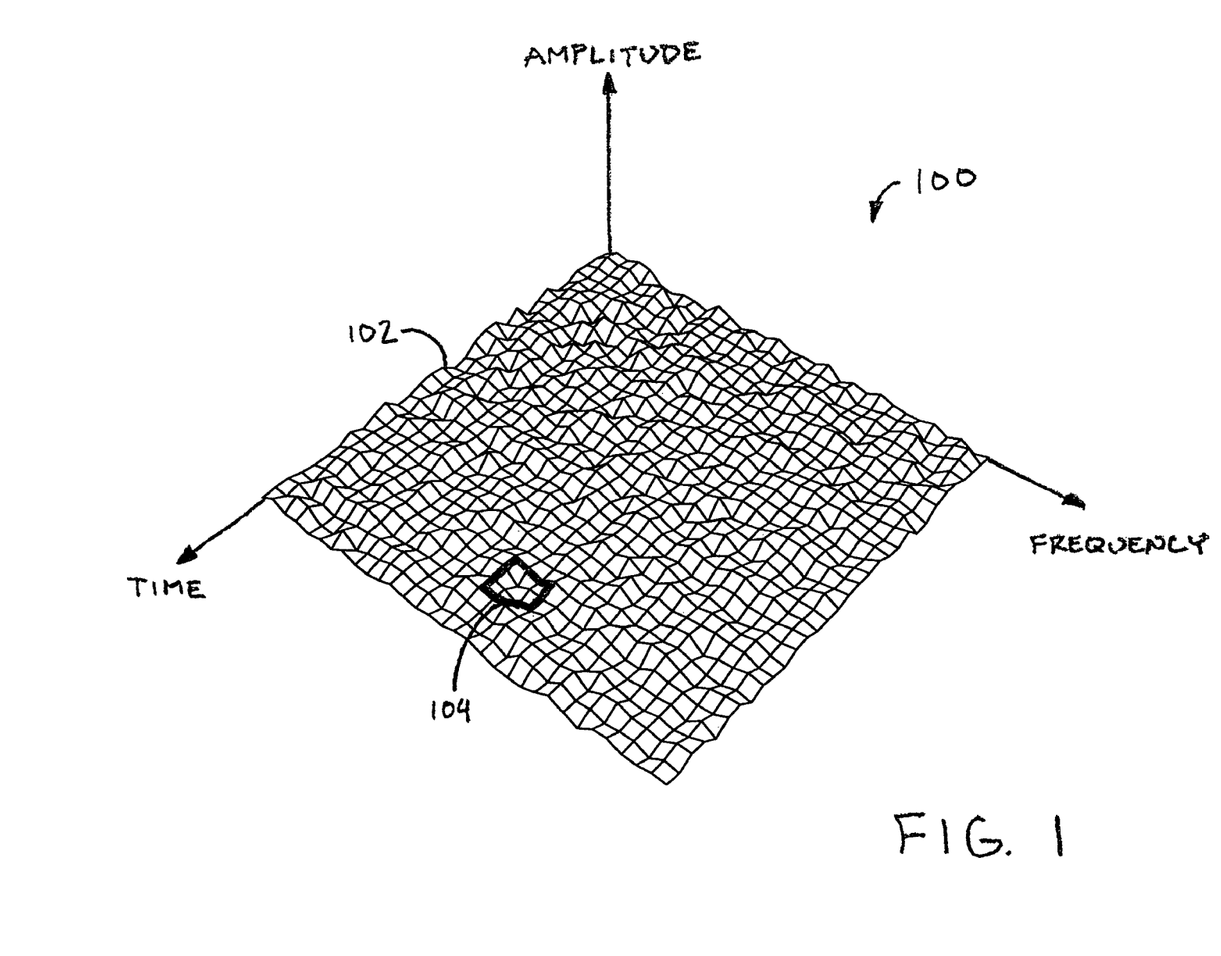
FIG. 1 is a block diagram illustrating a user interface that visually displays an example of three-dimensional representation of audio signal data, according to an embodiment of the invention.

FIG. 1 is a block diagram illustrating a user interface that visually displays an example of three-dimensional representation 100 of audio signal data, according to an embodiment of the invention. An audio signal data-editing program may display such a user interface, for example. Three-dimensional representations according to alternative embodiments of the invention may comprise additional or alternative features not shown in this example. Likewise, three-dimensional representations according to alternative embodiments of the invention may lack some features that are shown in this example.

In one embodiment of the invention, the X-, Y-, and Z-axes of three-dimensional representation 100 correspond to frequency, amplitude, and time, respectively. Such an embodiment of the invention is described below. Thus, in such an embodiment, a given point in the three-dimensional space depicted within the representation corresponds to the amplitude of a particular frequency at a particular time within audio signal data. In alternative embodiments of the invention, the axes of the three-dimensional representation may correspond to aspects of audio signal data other than frequency, amplitude, and time.

Three-dimensional representation 100 includes surface 102, which represents the points in the three-dimensional space at which corresponding sounds occur within the audio signal data. According to one embodiment of the invention, in response to defined user input, surface 102 rotates around a user-specified axis so that surface 102 is displayed at a different angle. As a result, a user can visualize all details of a set of audio signal data that relate to the frequency and amplitude of the represented sound.

A selection indicator 104 is displayed somewhere on surface 102. For example, selection indicator 104 may be displayed as a roughly square-shaped, visually distinctive border that "molds" to rest upon surface 102. The region encompassed by selection indicator 104 is the "selected area."

In response to user input, such as mouse movements or arrow-key depressions, selection indicator 104 moves about surface 102. For example, as a user moves a mouse away from himself, selection indicator 104 may move toward the "far" extent of surface 102, and as a user moves the mouse toward himself, selection indicator 104 may move toward the "near" extent of surface 102, thus designating different temporal intervals as falling within the selected area. Similarly, as a user moves a mouse toward his right, selection indicator 104 may move toward the "right" extent of surface 102, and as a user moves the mouse toward his left, selection indicator 104 may move toward the "left" extent of surface 102, thus designating different frequency ranges as falling within the selected area.

In one embodiment of the invention, under certain circumstances, a user-selected effect is applied to the portions of the audio signal data that correspond to the selected area that is encompassed by selection indicator 104. For example, the effect may be applied while a mouse button is being depressed, but not while the mouse button is not being depressed. Thus, in one embodiment of the invention, a user may "paint" surface 102 with the selected effect by clicking and dragging selection indicator 104 along surface 102.

Example Effects

For ease of explanation, in the following discussion, whenever a portion of audio signal data that occurs within the selected area represents a particular sound, the particular sound is referred to as being within the selected area.

In one embodiment of the invention, effects that a user can select as the "current" effect include a high-pass filter effect and a low-pass filter effect. When the high-pass filter effect is selected as the "current" effect, sounds that are at frequencies that are (a) within the selected area and (b) above a specified threshold amount are eliminated from the audio signal data when the effect is applied to the selected area. When the low-pass filter effect is selected as the "current" effect, sounds that are at frequencies that are (a) within the selected area and (b) below a specified threshold amount are eliminated from the audio signal data when the effect is applied to the selected area.

In one embodiment of the invention, effects that a user can select as the "current" effect include a volume increasing effect and a volume decreasing effect. When the volume increasing effect is selected as the "current" effect, the amplitudes of sounds that are within the selected area are increased by a specified amount or factor when the effect is applied to the selected area. When the volume decreasing effect is selected as the "current" effect, the amplitudes of sounds that are within the selected area are decreased by a specified amount of factor when the effect is applied to the selected area.

In one embodiment of the invention, effects that a user can select as the "current" effect include a "remove" effect. When the "remove" effect is selected as the "current" effect, the amplitudes of sounds that are within the selected area are reduced to zero when the effect is applied to the selected area.

In one embodiment of the invention, effects that a user can select as the "current" effect include an "add sound" effect. When the "add sound" effect is selected as the "current" effect, the sounds within a specified sample of audio signal data, which may be different from the audio signal data that is currently represented in three-dimensional representation 100, is mixed with the sounds that are within the selected area when the effect is applied to the selected area. The mixing may be performed by combining frequency-amplitude waves in the selected area with frequency-amplitude waves in the specified sample to generate composite frequency-amplitude waves for each time interval that occurs within the selected area. Techniques for combining waves in such a manner are well known.

In one embodiment of the invention, effects that a user can select as the "current" effect include a "replace sound" effect. When the "replace sound" effect is selected as the "current" effect, the sounds within a specified sample of audio signal data, which may be different from the audio signal data that is currently represented in three-dimensional representation 100, replace the sounds that are within the selected area when the effect is applied to the selected area.

In one embodiment of the invention, effects that a user can select as the "current" effect include a "compress" effect and a "stretch" effect. When the "compress" effect is selected as the "current" effect, the sounds that are within the selected area are compressed in time (thus effectively shrinking the size of the selected area along the time dimension axis), but not in frequency or amplitude, when the effect is applied to the selected area. When the "stretch" effect is selected as the "current" effect, the sounds that are within the selected area are expanded in time (thus effectively enlarging the size of the selected area along the time dimension axis), but not in frequency or amplitude, when the effect is applied to the selected area.

Unlike other techniques in which sound compression and sound stretching alters the frequencies of the sounds that are compressed or stretched, certain embodiments of the invention maintain the frequencies of the sounds within the selected area at the same levels throughout the compressing or stretching operation, so that the pitches of the sounds are not altered. Among other applications, this feature can be used to produce a "pitch-correct scratch" effect relative to selected sounds, similar to the effect produced by a deejay manually altering the speed of a recorded sound by rotating an LP on a turntable, except without altering the pitch of the recorded sound.

As is discussed above, in one embodiment of the invention, as selection indicator 104 is moved about surface 102, the selected effect might be applied to some aspects of the audio signal data but not others. In one embodiment of the invention, effects that a user can select as the "current" effect include one or more "remove 'X'" effects, where "X" is a particular category of sound. Some example categories of sound that the value of "X" may assume, such as "noise," "tone," and "transient sound," are discussed in greater detail below.

In one embodiment of the invention, when the "remove 'X'" effect is selected as the "current" effect, sounds that are (a) within the "X" category and (b) within the selected area are eliminated from the audio signal data without modifying any sounds that are not within the "X" category.

Choosing from Among Selection Indicators

As is discussed above, selection indicator 104 can be moved about surface 102 in order to change which part of surface 102 is the selected area and to apply, effects to sounds that fall within the selected area. In one embodiment of the invention, a user can select a "current" selection indicator from among a plurality of defined selection indicators. Similar to the way some graphical image editing programs allow a user to choose from among a plurality of "brush" shapes and sizes, an audio signal data-editing program according to an embodiment of the invention may display several defined selection indicators to a user, and the user may choose one of the defined selection indicators to be the "current" selection indicator. The shape and size of the selected area is based on the shape and size of the "current" selection indicator.

For example, in one embodiment of the invention, a user may select from among different shapes and sizes of selection indicators. Some selection indicators may be approximately square in shape, while other selection indicators may be approximately circular in shape. In one embodiment of the invention, the audio signal data-editing program allows a user to specify a custom shape and size for the "current" selection indicator. By choosing a larger selection indicator, a user may cause a larger area of surface 102 and more of the audio signal data to be influenced by applied effects.

Selection Masks

Many sounds do not have a compact support in the time-frequency domain. In other words, such sounds cannot be represented totally by a closed time-frequency selection region. Therefore, in one embodiment of the invention, the audio signal data-editing program allows a user to designate multiple selection areas separately and concurrently. Such selection areas might or might not be adjacent to each other. A user may accomplish this, for example, by holding down the CTRL or SHIFT key while selecting different regions of surface 102; while at least one of these keys is depressed, clicking on a different region of surface 102 does not cause the formerly selected area of surface 102 to become unselected.

Together, the multiple selection areas form a "selection mask." In one embodiment of the invention, the selection mask is depicted as a grid that has the same resolution as the displayed time-frequency spectrum. Each cell in the grid indicates a separate "selection value." The selection value for a particular cell indicates how much of the total selection mask that cell comprises.

The selection mask may be visually represented along with surface 102 in a variety of ways. For example, the selection mask may be visually represented as a gray-scale grid. For another example, the selection mask may be visually represented by visually distinguishing, from the remainder of surface 102 (e.g., through highlighting), portions of surface 102 that are within the selection mask.

After a user has defined a selection mask, the user can use the surface painting technique described herein to apply selected effects only to the regions of surface 102 that are within the defined selection mask. In one embodiment of the invention, while a selection mask is defined and active, regions of surface 102 over which selection indicator 104 passes are not modified unless those regions fall within the selection mask. In one embodiment of the invention, a selected effect may be applied only to portions of a cell within the selection mask.

The selection mask may be especially useful when a sound that a user wants to edit is a harmonic sound with a fundamental frequency and one or more "harmonics" that occur at frequencies that are integer multiples of the fundamental frequency (e.g., 1000 Hz, 2000 Hz, 3000 Hz, etc.). In one embodiment of the invention, the audio signal data-editing program allows the user to select a special "harmonic" selection indicator (or "brush") that only applies effects to sounds that have frequencies that are a specified fundamental frequency or integer multiples of that fundamental frequency.

Playing Sounds that Fall within the Selected Area

Although displaying a visual representation of the amplitudes of sounds at particular times and frequencies may assist a user in understanding the content of audio signal data, actually hearing the sound that is represented by a particular portion of surface 102 can sometimes be of even more assistance to the user's understanding. Therefore, in one embodiment of the invention, a feature is provided whereby a user can toggle a "play sound" feature of the audio signal data-editing program. While the "play sound" feature is toggled "on," the program audibly plays the sounds that fall within the selected area whenever the selected area changes due to the movement of selection indicator 104. Additionally or alternatively, in one embodiment of the invention, the sounds that fall within the current selected area are played in response to the user clicking a particular mouse button.

For example, when selection indicator 104 is moved to a different position on surface 102, the program may determine the time intervals that are represented within the selected area. The selected area represents a "time slice" of sound (e.g., from 5 seconds after the beginning of the entire represented sound until 6 seconds after the beginning of the entire represented sound) as well as a range of frequencies (e.g., from 233 hertz to 466 hertz). For each such time interval, in succession, the program may cause to be emitted, through a speaker, sounds that occur at that time interval. In one embodiment of the invention, only sounds at the frequencies that fall within the selected area are played. Thus, although the range of frequencies of sound that occur at a particular time interval may be relatively wide when considering the whole frequency spectrum represented by surface 102, a mere sub-range of frequencies within the wide range is played—the sub-range that is determined by the width of the "frequency" dimension of the perimeter of the current selected area.

For example, in such an embodiment of the invention, if the selected area is a portion of surface 102 that represents sounds that (a) are at frequencies between 233 hertz and 466 hertz and (b) occur between 5 seconds and 6 seconds from the time-wise beginning of the audio signal data as a whole, then only the sounds occurring at these frequencies and times are played. For example, relatively high frequency notes that occur toward the end of a song may be played if the selected area is positioned toward the near and right extremes of the time and frequency dimensions of surface 102.

Categorizing Sound

As is discussed above, the sound at a particular time and frequency may fall into one of several sound categories. In one embodiment of the invention, the sound represented at each time-frequency point on surface 102 is categorized as (a) noise, (b) tone, or (c) transient sound. Techniques for categorizing a sound as noise, tone, or transient sound are well known. For example, one such technique is described in "On the Use of Time-Frequency Reassignment in Additive Sound Modeling," by Kelly Fitz and Lippold Haken, (*Journal of the Audio Engineering Society*, 2002), which is incorporated by reference for all purposes as though fully and originally disclosed herein.

Generally speaking, sounds that fall within the "tone" category have sinusoidal waveforms, are continuous in time, and occupy a single frequency. Sounds that fall within the "noise" category are not tones, in that they do not have sinusoidal waveforms. Additionally, sounds that fall within the "noise" category are typically random frequency-wise. Sounds that fall within the "transient" category are sounds that are not necessarily tones per se, but represent transitions between two tones.

In one embodiment of the invention, surface 102 is visually segregated into a grid of sub-areas, as shown in FIG. 1. Each sub-area represents a time-frequency "bin" of sound. The sounds that fall within a particular bin may belong to different categories of sound. For example, a particular bin may comprise 85% tone, 12% transient sound, and 3% noise. Thus, each bin may comprise a different mixture of different categories of sound.

In one embodiment of the invention, each of the sub-areas discussed above is filled with a color. Each sub-area may be filled with a different color. In one embodiment of the invention, the mixture of the different categories of sound that occur within the particular sub-area determines a particular sub-area's color. For example, a sub-area that comprises only "tone" may be completely blue, and a sub-area that comprises only "noise" may be completely red. Thus, a sub-area that comprises approximately the same amount of "tone" and "noise" may be filled with a purple color, representing the approximately equal mixture of "tone" and "noise" in that sub-area. The colorful depiction of surface 102 in this manner helps a user to find the portions of the audio signal data that the user wants to edit.

Although in one embodiment of the invention sounds are categorized as being "tone," "noise," or "transient sound," in alternative embodiments of the invention, sounds may be categorized into additional or alternative categories based on additional or alternative criteria.

Removing Selected Categories of Sound Exclusively

As is discussed above, in one embodiment of the invention, as selection indicator 104 is moved about surface 102, the selected effect might be applied to some aspects of the audio signal data but not others. In one embodiment of the invention, the effects from which a user can select include a "remove tone" effect, a "remove noise" effect, and a "remove transient sound" effect.

When the "remove tone" effect is selected as the "current" effect, then sounds that are "tones" and that fall within the selected area are eliminated from the audio signal data when the effect is applied to the selected area, while sounds that are not "tones" are left unchanged within the selected area. Similarly, when the "remove noise" effect is selected as the "current" effect, then sounds that are "noises" and that fall within the selected area are eliminated from the audio signal data when the effect is applied to the selected area, while sounds that are not "noises" are left unchanged within the selected area. Similarly, when the "remove transient sound" effect is selected as the "current" effect, then sounds that are "transient sounds" and that fall within the selected area are eliminated from the audio signal data when the effect is applied to the selected area, while sounds that are not "transient sounds" are left unchanged within the selected area.

Applying such effects can change the composition of the mixture of sound categories that occur within sub-areas that fall within the selected area. Therefore, in one embodiment of the invention, when the composition of the mixture of sound categories that occur within a particular sub-area changes, the program updates the color that fills the particular sub-area to reflect the resulting composition.

Hardware Overview

Figure 2:
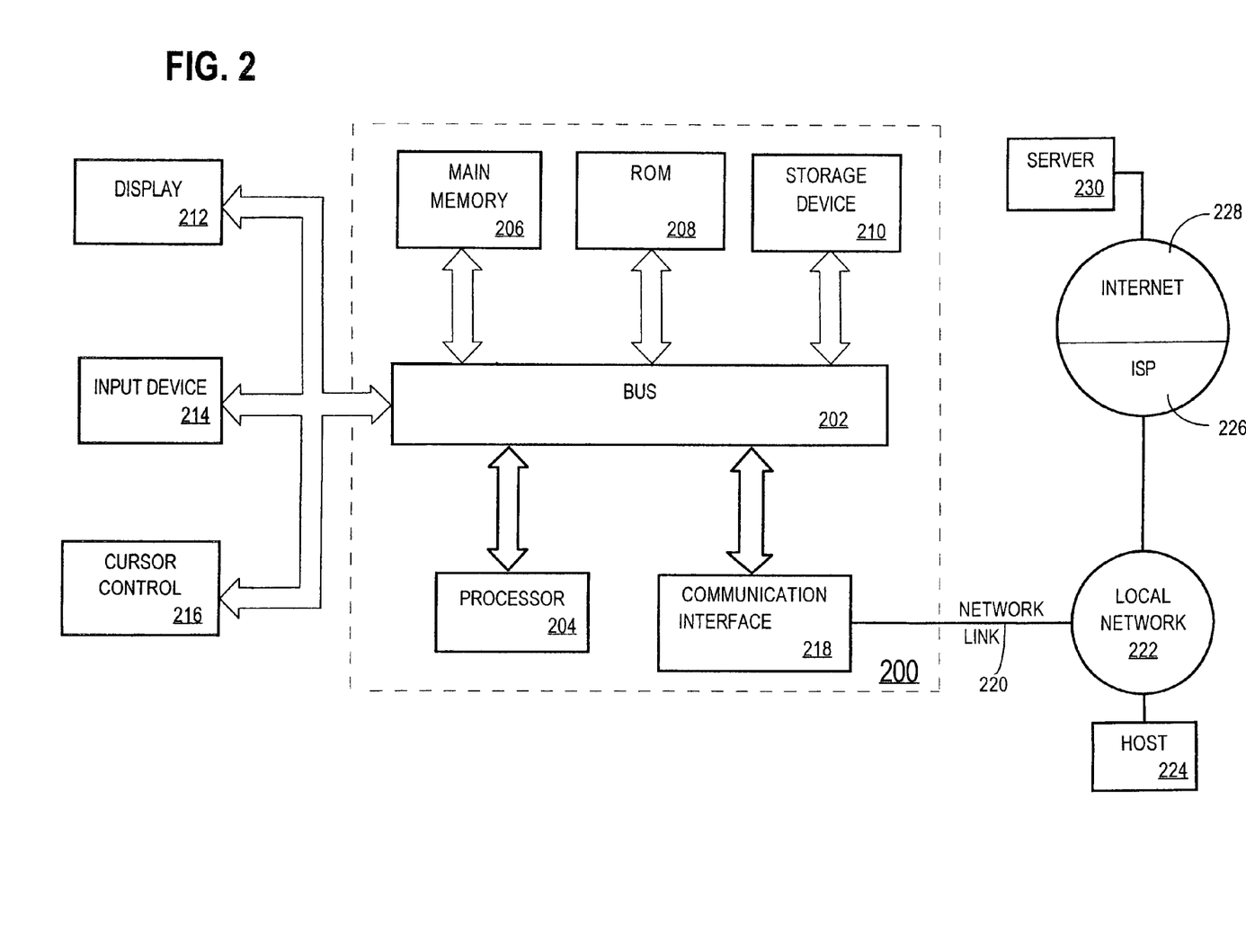
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for editing signal data, the method comprising steps of:

displaying original signal data as a three-dimensional representation, wherein each dimension of the representation corresponds to an attribute of the original signal data;

receiving user input that indicates a selected portion of the representation;

modifying the original signal data by applying an effect to one or more parts of the original signal data that correspond to the selected portion, thereby producing modified signal data; and storing the modified signal data on a computer-readable medium;

wherein three different attributes of the original signal data are spatially represented within the three-dimensional representation along three different spatial axes, each axis of the axes following a separate vector that points from a common reference point shared by the three different spatial axes, and each axis-following vector pointing in a different direction for each other axis-following vector;

wherein said steps are performed by one or more computing devices.

2. The method of claim 1, wherein a first dimension of the three dimensions represents a frequency of the signal data, a second dimension of the three dimensions represents an amplitude of the signal data, and a third dimension of the three dimensions represents time.

3. The method of claim 1, further comprising:
rotating the representation to display a view of the representation at a different angle than an angle at which the representation was previously displayed.

4. The method of claim 1, further comprising:
receiving user input that indicates a selection of a particular selection indicator from among a plurality of selection indicators;
wherein a size of the selected area is based on the particular selection indicator.

5. The method of claim 1, wherein the representation is displayed as a surface occupying three dimensions, wherein the selected portion is a selected two-dimensional area of the surface, and further comprising:
in response to user input, moving a two-dimensional selection indicator on the surface, wherein a location of the selection indicator on the surface determines which area of the surface is the selected area; and
after moving the selection indicator, playing at least a part of a sound that is represented by one or more parts of the signal data that correspond to the selected area without playing any sound that is not represented by any part of the signal data that corresponds to the selected area;
wherein the selected area comprises less than all of the surface; and
wherein two dimensions of the selection indicator are aligned with two of the three different spatial axes.

6. The method of claim 1, wherein:
the representation is displayed as a surface occupying three dimensions;
the selected portion is a selected area of the surface,
the selected area represents amplitudes of frequencies that occur within a first range of frequencies over a first period of time;
the surface represents amplitudes of frequencies that occur within a second range of frequencies over a second period of time;
the first range of frequencies is of lesser magnitude than the second range of frequencies; and
the first period of time is of lesser magnitude than the second period of time.

7. The method of claim 1, wherein the representation is displayed as a surface occupying three dimensions, wherein the selected portion is a selected area of the surface, and wherein displaying the representation comprises:

segregating the surface into a grid of sub-areas; and
for each sub-area in the grid, performing steps comprising:
categorizing, into one or more particular categories of sound, particular sounds that are represented by signal data that corresponds to the sub-area; and
displaying the sub-area in a color that is based on one or more categories of sound into which the particular sounds have been categorized.

8. The method of claim 7, wherein the particular categories of sound comprise noise, tone, and transient sound.

9. The method of claim 1, wherein applying the effect to the one or more parts of the signal data that correspond to the selected portion comprises:
applying the effect only to parts of the signal data that correspond to a particular category of sound, wherein the particular category is one of tone and transient sound.

10. The method of claim 1, wherein applying the effect to the one or more parts of the signal data that correspond to the selected portion comprises:
modifying a part of the signal data that corresponds to the selected portion so that the part represents sound from another audio signal in addition to sound that the part already represents.

11. The method of claim 1, wherein applying the effect to the one or more parts of the signal data that correspond to the selected portion comprises:
modifying only parts of the signal data that correspond to a specified fundamental frequency or an integer multiple of the specified fundamental frequency.

12. The method of claim 1, wherein the selected portion comprises a selection mask that a user has defined by separately selecting multiple regions of the representation.

13. A computer-readable non-transitory storage medium storing one or more sequences of instructions which, when executed by one or more processors, causes the one or more processors to perform the method recited in claim 1.

14. A computer-readable non-transitory storage medium storing one or more sequences of instructions which, when executed by one or more processors, causes the one or more processors to perform the method recited in claim 2.

15. A computer-readable non-transitory storage medium storing one or more sequences of instructions which, when executed by one or more processors, causes the one or more processors to perform the method recited in claim 3.

16. A computer-readable non-transitory storage medium storing one or more sequences of instructions which, when executed by one or more processors, causes the one or more processors to perform the method recited in claim 4.

17. A computer-readable non-transitory storage medium storing one or more sequences of instructions which, when executed by one or more processors, causes the one or more processors to perform the method recited in claim 5.

18. A computer-readable non-transitory storage medium storing one or more sequences of instructions which, when executed by one or more processors, causes the one or more processors to perform the method recited in claim 6.

19. A computer-readable non-transitory storage medium storing one or more sequences of instructions which, when executed by one or more processors, causes the one or more processors to perform the method recited in claim 7.

20. A computer-readable non-transitory storage medium storing one or more sequences of instructions which, when executed by one or more processors, causes the one or more processors to perform the method recited in claim 8.

21. A computer-readable non-transitory storage medium storing one or more sequences of instructions which, when executed by one or more processors, causes the one or more processors to perform the method recited in claim 9.

22. A computer-readable non-transitory storage medium storing one or more sequences of instructions which, when executed by one or more processors, causes the one or more processors to perform the method recited in claim 10.

23. A computer-readable non-transitory storage medium storing one or more sequences of instructions which, when executed by one or more processors, causes the one or more processors to perform the method recited in claim 11.

24. A computer-readable non-transitory storage medium storing one or more sequences of instructions which, when executed by one or more processors, causes the one or more processors to perform the method recited in claim 12.

25. A computer-implemented method for visualizing signal data, the method comprising steps of:

categorizing separate portions of the signal data into separate categories of sound of a plurality of categories of sound;

displaying the signal data as a three-dimensional representation;

wherein the dimensions of the representation correspond to dimensions of frequency, amplitude, and time; and wherein displaying the representation comprises coloring sections of the representation based on categories of sound to which parts of the signal data corresponding to the sections belong;

wherein each category of the plurality of categories is associated with a different color;

wherein said steps are performed by one or more computing devices.

26. The method of claim 25, wherein coloring sections of the representation comprises blending together multiple sound-category-associated colors in proportions that are based on the comparative extents to which sound within a particular section belongs to each of the sound categories, thereby producing a uniform mixed color for that particular section, and filling in the particular section entirely with the uniform mixed color for that particular section.

27. A computer-readable non-transitory storage medium storing one or more sequences of instructions which, when executed by one or more processors, causes the one or more processors to perform the method recited in claim 25.

28. A computer-readable non-transitory storage medium storing one or more sequences of instructions which, when executed by one or more processors, causes the one or more processors to perform the method recited in claim 26.

* * * * *